(No Model.)
S. GISSINGER.
CAR AXLE.
No. 386,460. Patented July 24, 1888.
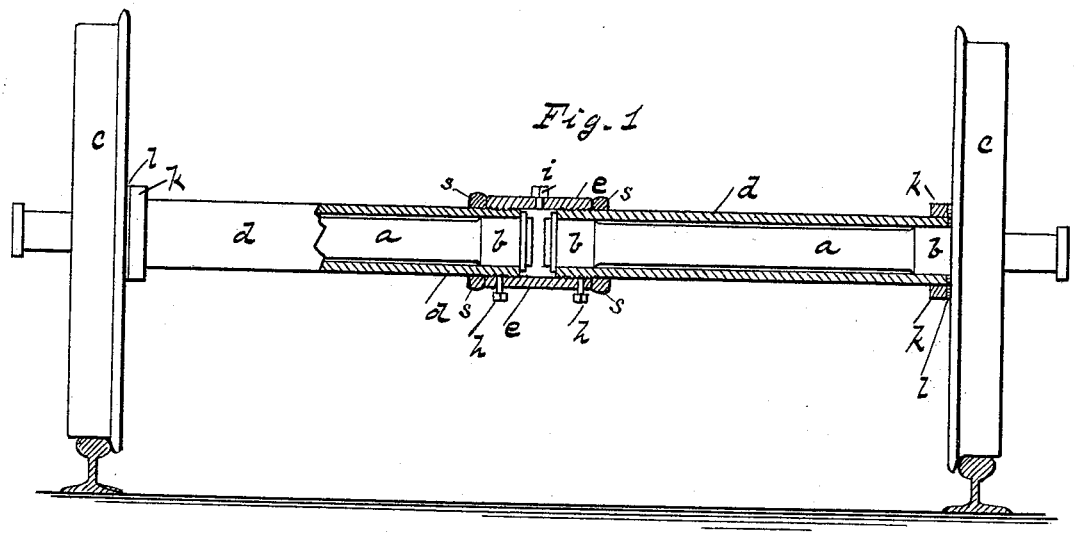
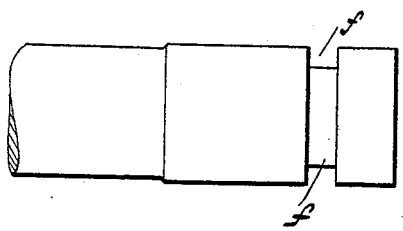
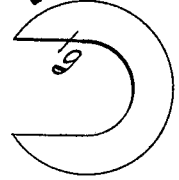
Witnesses:
H. E. Harrison
J. A. Carline
Inventor
Samuel Gissinger
Per O. D. Levis
Att'y.

United States Patent Office.

SAMUEL GISSINGER, OF PITTSBURG, PENNSYLVANIA, ASSIGNOR OF ONE-HALF TO SAMUEL WAINWRIGHT, OF SAME PLACE.

CAR-AXLE.

SPECIFICATION forming part of Letters Patent No. 386,460, dated July 24, 1888.

Application filed December 3, 1887. Serial No. 256,952. (No model.)

*To all whom it may concern:*

Be it known that I, SAMUEL GISSINGER, a citizen of the United States, residing at Pittsburg, in the county of Allegheny and State of Pennsylvania, have invented a certain new and useful Improvement in Railway-Car Axles; and I do hereby declare the following to be a full, clear, and exact description of the invention, such as will enable others skilled in the art to which it pertains to make and use the same, reference being had to the accompanying drawings, which form a part of this specification.

My invention relates to an improvement in railway-car axles, the object being to provide a means whereby each wheel may revolve independent of the other, and thereby reduce the friction on the wheels when the same are traveling about a curve, together with certain other details of construction and combination of parts, as will be fully set forth hereinafter.

In the accompanying drawings, Figure 1 is a side sectional elevation of a railway-truck provided with an axle constructed in accordance with my invention. Fig. 2 is an elevation of the end of the axle, showing the groove in the same, which forms a part of a device for locking that portion of the axle in the tube which surrounds the same. Fig. 3 is a side view of the washer, which occupies a position in the above-mentioned groove. Fig. 4 is an end elevation of the same.

To put my invention into practice, I divide the axle $a$ at the center and provide the same with enlargements or bearings $b$ at each end and near their junction with the wheels $c$. I next provide two sections of pipe, $d$, each about the length of the divided portions of the axle $a$. On each of the inner ends of these tubes $d$, I form a screw-thread, which enters a coupling, $e$, and joins the two portions of the tubes $d$ together. On the inner ends of the axle $a$, I form a groove, $f$, in which is fitted an open washer, $g$, the outside diameter of which exceeds that of the axle $a$, which washer $g$, when in position, locks the section of tubing $d$ securely to the axle $a$. Small set-screws $h$, entering through the sleeve or coupling $e$, serve as a means of preventing the tubes $d$ from detaching themselves or becoming loose from the coupling $e$. An opening in this coupling $e$, and fitted with a small screw-plug, $i$, is used for lubricating the bearings $b$ of the axle $a$. At the outer ends of the tubes $d$, I secure rigidly a collar, $k$, which forms a substantial bearing against the hubs of the wheels $c$. A washer, $l$, placed between this bearing $b$ and the hub will prevent the two parts from destroying each other by friction. In place of the set-screws $h$, a jam-nut, $s$, at each end of the coupling $e$, may be used for regulating the space between the wheels $c$.

It will be seen that by this construction the gage of the wheels $c$ may be altered or changed by means of the screw-threads in the coupling, thus avoiding the necessity of accurately fitting the tubes $d$ in the direction of their length.

With this construction each wheel $c$ may revolve independent of the other, thereby reducing the friction on the wheels when the same are traveling about a curve.

Having thus described my invention, what I claim, and desire to secure by Letters Patent, is—

In a device for the purpose set forth, the combination consisting of the divided axle $a$, having formed in each of its inner ends a groove, $f$, in which an open washer, $g$, may be placed for the purpose of locking the parts together, the sleeve or coupling $e$, for attaching the two sections of tubing $d$ together, the set-screws $h$, entering the coupling $e$, and an opening in the said coupling for the purpose of introducing a proper lubricant to the bearings, substantially as and for the purpose described.

SAMUEL GISSINGER.

Witnesses:
O. D. LEVIS,
C. C. LEE.